United States Patent

[11] 3,628,093

[72] Inventor George C. Crowley
 Winnetka, Ill.
[21] Appl. No. 27,740
[22] Filed Apr. 13, 1970
[45] Patented Dec. 14, 1971
[73] Assignee Northern Electric Company
 Chicago, Ill.

[54] THERMOSTAT OVERHEAT PROTECTION SYSTEM FOR AN ELECTRIC APPLIANCE SUCH AS A BLANKET
 10 Claims, 6 Drawing Figs.

[52] U.S. Cl. .................................................. 317/18 A,
 317/16, 317/40 A, 337/415, 219/212
[51] Int. Cl. ........................................................ H02h 1/02,
 H02h 5/04, H01h 37/76
[50] Field of Search .......................................... 337/415;
 219/212; 317/16, 18 A, 40 R, 40 A

[56] References Cited
 UNITED STATES PATENTS
 2,185,944 1/1940 Holmes ........................ 337/415
 2,914,645 11/1959 Wallace ........................ 219/212
 3,396,265 8/1968 Jacobson ....................... 219/212

Primary Examiner—L. T. Hix
Attorney—Hill, Sherman, Meroni, Gross & Simpson

ABSTRACT: Temperature responsive protection system for an appliance such as an electric blanket which utilizes a pair of conductors which form a part of the heating or sensing circuit and which are insulated under normal temperature operating conditions by temperature responsive material which melts to establish electrical contact between the conductors if an overheat condition exists.

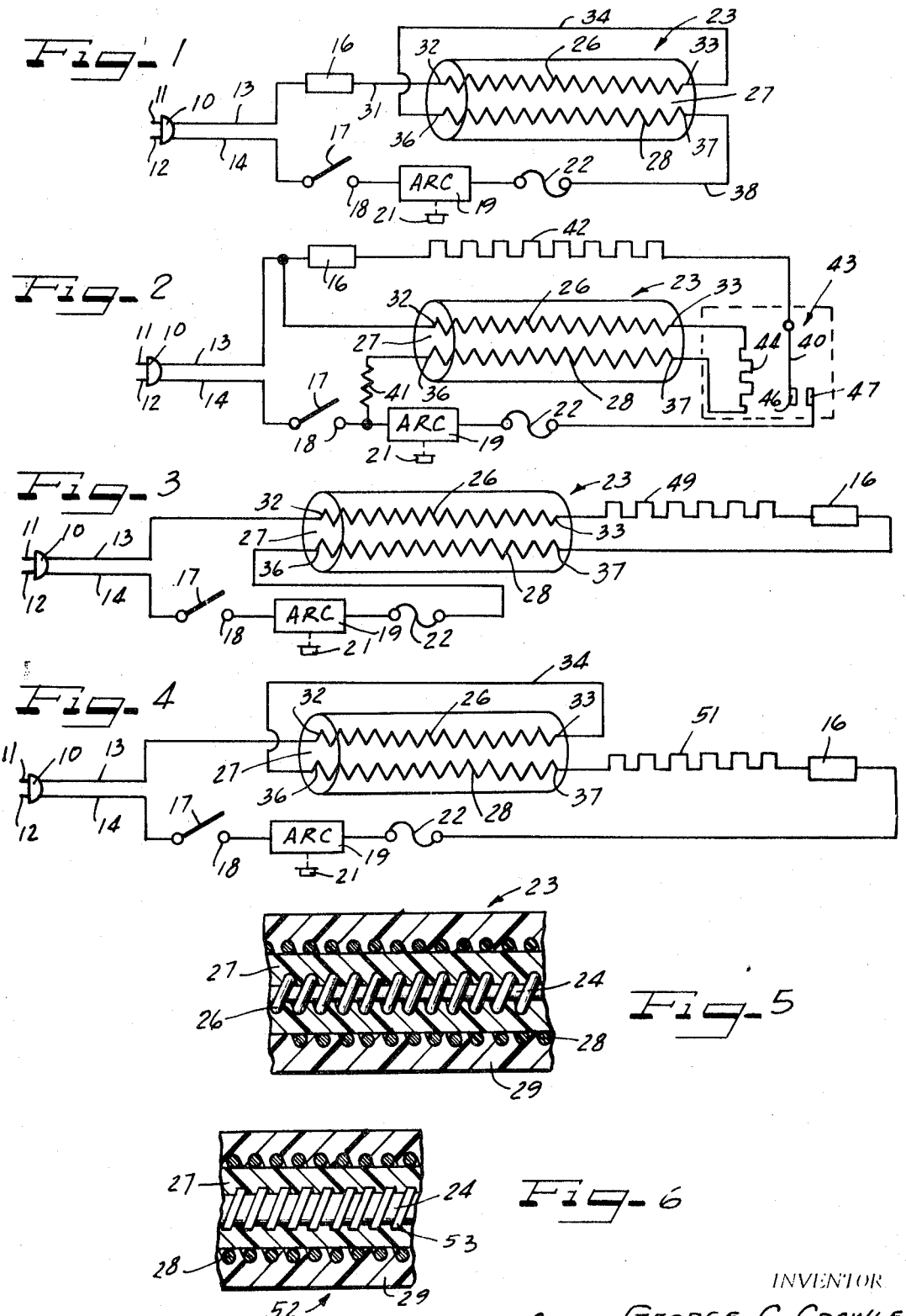

THERMOSTAT OVERHEAT PROTECTION SYSTEM FOR AN ELECTRIC APPLIANCE SUCH AS A BLANKET

BACKGROUND OF THE INVENTION

1. Field of the Invention

This invention relates in general to an overheat protection system for an electrical appliance such as an electric blanket and in particular to a temperature protection system which is 100 percent effective.

2. Description of the Prior Art

In electrical appliances such as electric blankets it is imperative that protective devices be provided so that the blanket cannot become overheated causing fire or injury to the users. It is customary to mount a number of thermostats, as for example, nine, throughout the blanket to sense at particular locations the local temperature. If any of these thermostats are subject to an overheat condition the thermostat will open thus disconnecting power to the blanket. However, if an overheat condition exists at a location where one of the thermostats is not mounted, it is possible that an overheat condition could exist which would not be detected by the thermostats to turn off power to the blanket.

SUMMARY OF THE INVENTION

The present invention provides an overheat protection system for electrical appliances as for example an electric blanket which uses a sensor and/or heating element formed of two electrical conductors separated from each other by a fusible material which under normal conditions of operation in the safe temperature range provides electrical insulation between the conductors but which will fuse to allow the conductors to make electrical contact in the event the temperature at any point along the conductors exceeds the safe operating temperature of the blanket. The conductors may, in a preferred embodiment, be wound spirally about a central core and with the fusible material spaced between the inner conductor and the outer conductor and the assembly covered by external insulation. A plurality of thermostats may also be mounted at various locations in the blanket in a conventional manner to sense local overheat conditions to disconnect power to the blanket if a local overheat condition exists. The protective conductors imbedded in the fusible material of the invention will provide 100 percent protection at all points at which the conductors are located and can fuse at any point to turn power off to the blanket. Thus, a 100 percent safe appliance is provided by this invention.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a schematic view of the invention in which the sensing wires are used as a heating element with each of the two conductors dissipating half of the applied power;

FIG. 2 is a schematic view of a modification of the invention wherein the sensing wires are used as an overheat protection sensor and are connected to energize a thermal relay;

FIG. 3 is a schematic view of a modification of the invention wherein a portion of the blanket is wired with conventional heating elements and the other portion consists of the double concentric fusible wires of the invention;

FIG. 4 a schematic view of a further modification of the invention;

FIG. 5 is a detailed sectional view of the fusible wire of the invention; and

FIG. 6 is a partial sectional view of a modification of the fusible wire of this invention.

DESCRIPTION OF THE PREFERRED EMBODIMENTS

FIG. 1 is a schematic view of the blanket overheat protection system according to this invention and illustrates a power plug 10 which has prongs 11 and 12 for insertion into a conventional power supply, as for example, 120 volts AC. Electrical conductor 13 is connected to one of the prongs of plug 10 and is connected to a number of thermostats designated generally as 16 which are placed at various locations in the blanket to sense overheat conditions. The sensing and heating element of this invention is designated generally as 23 and as shown in FIG. 5 comprises a central core 24 of a flexible insulating material about which a first conductor 26 is spirally wound. Fusible insulating material 27 surrounds the conductor 26 and a second conductor 28 is spirally wound about the fusible material 27 as shown. An outer insulating layer 29, made of plastic or other insulating material, provides insulation and protection. The conductors 26 and 28 may be conventional heating element wire and the fusible insulating material 27 might be nylon, which melts at approximately 400° F., polyvinyl chloride, which melts at approximately 200° F., or polyethylene which melts at 250°–300° F. The fusible insulating material 27 is selected so that under normal operating conditions of the blanket, it does not fuse and provides insulation between the conductors 26 and 28, but when an overheat situation exists which is not detected by the thermostats 16, the material 27 will become liquid and allow electrical contact to be made between the conductors 26 and 28.

The continuous fusible element 23 is shown in FIG. 1 with a first end 32 of conductor 26 connected through the thermostat 16 to the lead 13. The second end 33 of conductor 26 is connected to lead 34 which connects to the first end 36 of conductor 28. The second end 37 of the conductor 28 is connected by a connector 38 to a fuse 22 which is connected to an ambient responsive control 19 that may have a control knob 21 for setting a desired temperature. Lead 14 is connected to power plug 10 and to a movable contact 17 of an ON-OFF switch which may be moved to engage stationary contact 18 which is connected to the control 19.

It is to be realized that the sensing wire assembly 23 is used as the heating element in the embodiment illustrated in FIG. 1 with the conductors 26 and 28 dissipating half of the power. Since the second end 33 of the conductor 26 is connected to the first end 36 of conductor 28 which is adjacent the first end 32 of conductor 26, a potential will exist between the conductors 26 and 28 at any point of one-half the line voltage. Thus, at any point along the sensing-heating element 23, a potential of half the line voltage will exist. For example, if 120 volts AC is applied to the power plug 10, a voltage difference of 60 volts will exist between the conductors 26 and 28. It is to be realized that although the element of 23 is illustrated schematically, in an actual blanket it would comprise the heating element of the blanket and would be shuttled into each of the heating channels of the blanket. It is also to be realized that the thermostats 16 would be mounted at various locations in the element 23. For example, there might be nine of the thermostats 16 located at nine different locations in the blanket and they would be connected in series with the current through the conductors 26 and 28 so that if a temperature overheat condition is sensed by one of the thermostats it will open thus interrupting current through the heating element of the blanket.

In the event that an overheat condition exists in the blanket at a location other than those where the thermostats 16 are mounted, the material 27 will become a liquid and will allow the conductors 26 and 28 to make electrical contact thus substantially increasing the current in the lines 13 and 14 which will cause the fuse 22 to open. Since with 120 volts applied to the lines 13 and 14, 60 volts would exist between the conductors 26 and 28 at all points, a short between these conductors would cause the current through the fuse 22 to be doubled. For example, the current might jump from 1 to 2 amps when electrical contact is made between the conductors 26 and 28 and the fuse 22 is selected so that it will operate at 1 amp but will burn out at 2 amps.

Thus, the structure illustrated in FIG. 1 provides 100 percent overheat protection for an electric blanket in that all portions of the heating element will sense the overheat condition and cause the fuse 22 to burn out.

FIG. 2 is a modification of the invention illustrated in FIG. 1 in which the element 23 is not used as a heating element but is used simply as an overheat protection sensor. A conventional blanket heating element wire 42 is connected to lead 13 with thermostats 16 located at various positions in the heating element 42 in a conventional manner and a thermal relay 43 is connected in series with the heating element 42 and has contacts 46 and 47. The contact 46 is mounted on a temperature responsive bimetallic element 40 and a heater 44 is connected adjacent the bimetallic element 40 so that when the heater 44 receives normal current it provides sufficient heat to close the contacts 46 and 47. The contact 47 is connected to the fuse 22 and through the ambient responsive control 19 to contact 18 of ON-OFF switch 17. The sensing element 23 is constructed as illustrated in FIG. 5 but may have lower resistance conductors. The first end 32 of conductor 26 is connected to conductor 13 and the second end 33 of conductor 26 is connected to one side of the heating element 44. The other side of the heating element 44 is connected to the second end 37 of the conductor 28 and the first end 36 of the conductor 28 is connected to contact 18 through a resistor 41.

The sensing wire 23 illustrated in FIG. 2 may be channeled into every channel of the heating element 42 or every other channel, or every third channel. The sensing element 23 would be of a sufficient length to assure that an overheat condition could not occur between any of the thermostats.

In the event an overheat condition exists which is not effective to open one of the thermostats 16 the material 27 would melt and allow the conductors 26 and 28 to make electrical contact thus shunting the heater 44 of the thermal relay 43. When this occurs the heater 44 will cool thus allowing the bimetallic element 40 to move the contact 46 out of engagement with the contact 47 thus disconnecting power from the heating element 42.

FIGS. 3 and 4 illustrate modifications wherein the blanket may be wired utilizing a standard heating element for half the heating capacity and with fusible double element concentric wire according to this invention for the other half of the heating element. The thermostats 16 are mounted at various locations in the conventional heating element.

In FIG. 3, for example, the power line 13 is connected to the first end 32 of the conductor 26 and the second end 33 is connected to one end of standard heating element 49. The second end 37 of conductor 28 is connected to the other side of the heating element 49 and thermostats 16. The first end 36 of conductor 28 is connected to the fuse 22. With the arrangement of FIG. 3, if the voltage drop across the heater 49 is 40 volts, a difference of 40 volts will exist between ends 33 and 37 of conductors 26 and 28 and full line voltage will exist between ends 32 and 36 of conductors 26 and 28.

In the event an overheat condition exits which is not detected by the thermostats 16, the material 27 will melt and the current through the fuse 22 will appreciably increase thus causing the fuse to burn out turning off power to the blanket.

The circuit of FIG. 4 is a modification of that in FIG. 3 wherein the second end 33 of the conductor 26 is connected to the first end 36 of the conductor 28 and the second end 37 of the conductor 28 is connected to the heater 51 and thermostats 16. In this embodiment, if the voltage drop across the heater 51 is 40 volts, the voltage gradient between the conductors 26 and 28 at any point will be 40 volts. Thus, when an overheat condition exists which is not detected by a thermostat 16 the fusible material 27 will short the wires 26 and 28 and the current will increase thus causing the fuse 22 to burn out.

In the embodiments illustrated in FIGS. 3 and 4, the blanket may be shuttled with two channels of standard heating wires, skipping two channels, the next two channels with standard heating wires, and so on through the blanket. The fusible wire of this invention may be shuttled into the blanket channels so that across the blanket there are two channels of standard wire, two channels of fusible wire, and so on.

In the various embodiments illustrated in FIGS. 1 through 4 fuses which have different sensitivities are used so that when a short occurs between the conductors 26 and 28, the fuse would burn out.

FIG. 6 is a modification of the fusible sensing heating element of the invention wherein the core 24 is wound with conductor 53 of ribbon form. The insulating fusible material 27 covers the conductor 53 and the outer conductor 28 is wound about the material 27. The outer insulator 29 surrounds the assembly to form the fusible heating-sensing element 52.

Although minor modifications might be suggested by those versed in the art, it should be understood that I wish to embody within the scope of the patent warranted hereon all such modifications as reasonably and properly come within the scope of my contribution to the art.

What I claim is:

1. A flexible electrical protective device for mounting in a flexible electrical applicance comprising:
    a flexible core of insulating material;
    a first flexible electrical conductor wound about said core;
    a flexible fusible insulating layer formed over said first conductor and said core; and
    a second flexible electrical conductor wound over said flexible fusible insulating layer and said first and second flexible electrical conductors making physical contact when said flexible fusible insulating layer melts.
2. A flexible electrical protective device according to claim 1 wherein said flexible fusible insulating layer is nylon.
3. A flexible electrical protective device according to claim 1 wherein said flexible fusible insulating layer is polyethylene.
4. A flexible electrical protective device according to claim 1 wherein said flexible fusible insulating layer is polyvinylchloride.
5. A flexible electrical protective device according to claim 1 including a flexible insulating protective cover formed over said second flexible electrical conductor and said flexible fusible insulating layer.
6. A protective device according to claim 5 wherein at least one of said first and second conductors is round in cross section.
7. A protective device according to claim 5 wherein at least one of said first and second conductors is ribbon shaped.
8. A protective device according to claim 5 wherein said first and second electrical conductors are heating elements for said flexible appliance.
9. A protective device according to claim 5 wherein said first and second electrical conductors are formed of low resistance material and are not heating elements of said flexible appliance.
10. A protective device for a flexible electrical appliance comprising:
    a heating element formed with a core of flexible insulating material;
    a first flexible conductor wound about said core;
    a flexible fusible insulating layer covering said first flexible conductor and under normal operating conditions comprising an insulator and which under overheat conditions melts;
    a second flexible conductor wound about said flexible fusible insulating layer;
    said heating element mounted in said flexible appliance so as to provide substantially uniform heating;
    a pair of power leads with one of said leads connected to a first end of said first flexible conductor and the second end of said first flexible conductor connected to the first end of said second flexible conductor; and
    a current responsive switch with one side connected to the second end of the second flexible conductor, and the second of said pair of power leads connected to the other side of said current responsive switch.

* * * * *